United States Patent
Pierdet et al.

[11] 3,818,056
[45] June 18, 1974

[54] 11 ALPHA-ALKOXYLATED STEROIDS, PROCESS AND THERAPEUTIC METHOD

[75] Inventors: Andre Pierdet, Noisy-le-Sec; Claude Bonne, Bry-sur-Marne, both of France

[73] Assignee: Roussel Uclaf, Paris, France

[22] Filed: June 2, 1972

[21] Appl. No.: 259,218

[30] Foreign Application Priority Data
June 7, 1971 France .............................. 71.20453

[52] U.S. Cl............ 260/397.45, 260/397.5, 424/238
[51] Int. Cl.......................................... C07c 169/08
[58] Field of Search..................... 260/397.45, 397.5

[56] References Cited
UNITED STATES PATENTS
2,885,413   5/1959   Hogg et al. .................... 260/397.45
3,579,545   5/1971   Bertin et al. ..................... 260/397.5

*Primary Examiner*—Elbert L. Roberts
*Attorney, Agent, or Firm*—Hammond & Littell

[57] ABSTRACT

11α-alkoxylated steroids having the formula

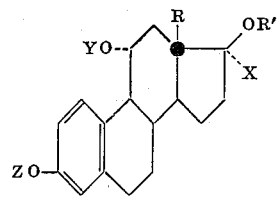

wherein R is alkyl having one to three carbon atoms, X represents a member selected from the group consisting of hydrogen, aliphatic hydrocarbon having one to six carbon atoms, halogenated aliphatic hydrocarbon having one to six carbon atoms, and cycloalkyl having three to six carbon atoms, Y is alkyl having one to six carbon atoms, Z represents a member selected from the group consisting of hydrogen, alkyl having one to six carbon atoms and phenyl alkyl having seven to nine carbon atoms, and R' represents a member selected from the group consisting of hydrogen and the acyl of an organic carboxylic acid having from one to 18 carbon atoms; as well as a process for preparing the compounds, therapeutic compositions and methods. The 11α-alkoxylated steroids possess anti-estrogenic, anti-gonadotrophic and exogenic anti-androgenic activity.

12 Claims, No Drawings

11 ALPHA-ALKOXYLATED STEROIDS, PROCESS AND THERAPEUTIC METHOD

OBJECTS OF THE INVENTION

An object of the present invention is the obtaining of 11α-alkoxylated steroids having the formula

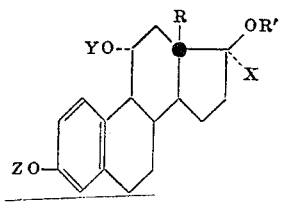

wherein R is alkyl having one to three carbon atoms, X represents a member selected from the group consisting of hydrogen, aliphatic hydrocarbon having one to six carbon atoms, halogenated aliphatic hydrocarbon having one to six carbon atoms, and cycloalkyl having three to six carbon atoms, Y is alkyl having one to six carbon atoms, Z represents a member selected from the group consisting of hydrogen, alkyl having one to six carbon atoms and phenyl alkyl having seven to nine carbon atoms, and R' represents a member selected from the group consisting of hydrogen and the acyl of an organic carboxylic acid having from one to 18 carbon atoms.

Another object of the present invention is the development of a process for the preparation of the above 11α-alkoxylated steroids which consists essentially of reacting a 13β-R-gonatetraenediol having the formula

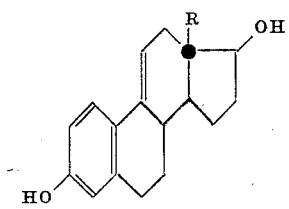

wherein R is alkyl having one to three carbon atoms, with an etherifying agent to form an easily cleavable ether, hydrating the 9(11) double bond of the resultant diether having the formula

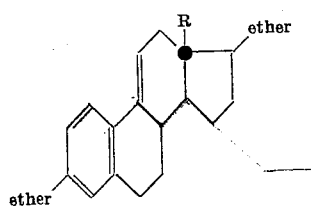

wherein R has the above-assigned values and "ether" represents an easily cleavable ether, by the action of a double bond hydrating agent selected from the group consisting of (1) boron trifluoride in the presence of an alkali metal borohydride or lithium aluminum hydride, followed by the action of hydrogen peroxide in an alkaline media, (2) diborane, followed by the action of hydrogen peroxide in an alkaline media, and (3) mercuric acetate in the presence of an alkali metal borohydride, reacting the resultant 11α-hydroxy steroid having the formula

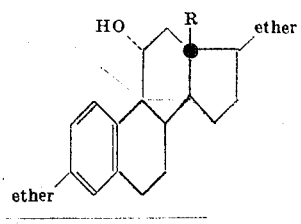

wherein R and "ether" have the above-assigned values, with a strong base followed by an alkylation agent, wherein the alkyl in said alkylation agent has from one to six carbon atoms, cleaving the resultant compound having the formula

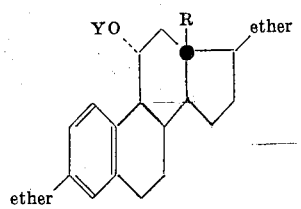

wherein R and "ether" have the above-assigned values and Y is alkyl having one to six carbon atoms, by the action of an acid in an aqueous media or by hydrogen in the presence of a catalyst and recovering said 11α-alkoxylated steroids.

A further object of the invention is the developement of pharmaceutical compositions containing the above 11α-alkoxylated steroids and therapeutic methods utilizing the above 11α-alkoxylated steroids.

These and other objects of the invention will become more apparent as the description thereof proceeds.

DESCRIPTION OF THE INVENTION

The present invention is directed to compounds of the general formula I

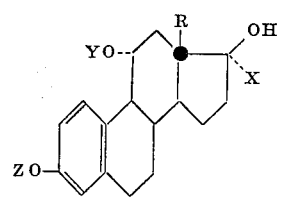

(I)

in which R represents alkyl having one to three carbon atoms, X represents hydrogen or a substituted or unsubstituted, hydrocarbon radical having from one to six carbon atoms, or a cycloalkyl having three to six carbon atoms, Y represents alkyl having one to six carbon atoms and Z represents hydrogen, alkyl having one to six carbon atoms or aralkyl having seven to nine carbon atoms, as well as esters in the 17 position of these compounds.

In compound I, preferentially X represents hydrogen or aliphatic hydrocarbon having one to six carbon atoms, halogenated aliphatic hydrocarbon having one to six carbon atoms, and cycloalkyl having three to six carbon atoms. In particular X can be alkyl, such as methyl, ethyl, propyl, isopropyl; alkenyl, such as vinyl, allyl, 2-methylallyl, or butenyl; alkynyl such as ethynyl, 1-propynyl, 2-propynyl, 2-butynyl or butadiynyl; haloalkynyl, such as chlorethynyl, trifluoropropynyl; and cycloalkyl, such as cyclopropyl, cyclopentyl or cyclohexyl.

The esters in the 17 position of compound I are those derived from organic carboxylic acids having from one to 18 carbon atoms such as aliphatic or cycloaliphatic, saturated or unsaturated carboxylic acids or aromatic or heterocyclic carboxylic acids, such as, for example, formic, acetic, propionic, butyric, isobutyric, valeric, isovaleric, trimethylacetic, caproic, β-trimethylpropionic, oenanthic, caprylic, pelargonic, capric, undecylic, undecylenic, lauric, myristic, palmitic, stearic, oleic, cyclopentylcarboxylic, cyclopropylcarboxylic, cyclobutylcarboxylic and cyclohexylcarboxylic acids, cyclopropylmethylcarboxylic acid, cyclobutylmethylcarboxylic acid, and cyclopentylacetic or -propionic, cyclohexylacetic or -propionic or phenylacetic or -propionic acid, benzoic acid, phenoxyalkanoic acids such as phenoxyacetic, parachlorophenoxy-acetic, 2,4-dichlorophenoxyacetic, 4-ter.-butylphenoxyacetic, 3-phenoxypropionic, 4-phenoxybutyric acids, furane-2-carboxylic 5-ter.-butylfurane-2-carboxylic acids, 5-bromofurane-2-carboxylic acid, nicotinic acids and β-ketocarboxylic acids, for example, acetylacetic acid, propionylacetic acid, butyryl-acetic acid, amino acids such as diethylaminoacetic acid and aspartic acid.

In place of the carboxylic acids, esters of sulfonic acids as well as those of phosphoric acid, sulfuric acid or halogenated hydracids may be produced.

Among the compounds I, particularly 11α-methoxy-17α-ethynyl-estra-1,3,5(10)-triene-3,17β-diol and 11-α-methoxyestra-1,3,5(10)-triene-3,17β-diol are to be noted.

The compounds of the invention are endowed with interesting physiological properties. They particularly possess anti-estrogenic, anti-gonadotrophic and an exogenic anti-androgenic activity. They are deprived of an estrogenic effect. They can be utilized particularly for treatment of prostatic adenoma as an aid in the treatment of cancer of the prostate, for treatment of hyperandrogenia, of acne, of seborrhea, and of hirsutism without causing secondary effects, such as gynecomastia or loss of the libido.

They may be used orally, transcutaneously, perlingually or rectally. Compositions containing the compound of the invention can be in the form of injectable solutions or suspensions, prepared in ampoules and multiple-dose flacons, tablets, coated tablets, sublingual tablets, gelules and suppositories.

The useful dosology is controlled between 1 and 100 mg per day in the adult as a function of the method of administration. The single dose is controlled between 1 and 50 mg. The compounds of the general formula I are administered to warm-blooded animals in amounts of from 0.01 to 2 mg/kg per day.

The pharmaceutical forms, such as the injectable solutions or suspensions, tablets, coated tablets, sublingual tablets, gelules and suppositories are prepared according to the usual processes.

The process of preparation of the compounds of the invention is essentially characterized in A. reacting a 13β-R-gona-1,3,5(10),9(11)-tetraen-3,17β-diol of the formula II

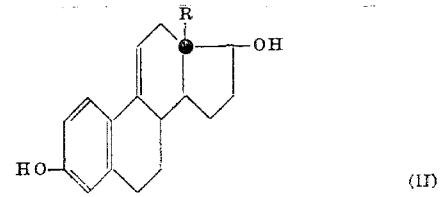

wherein R is alkyl having one to three carbon atoms, with an etherifying agent to form an easily cleavable ether, B. hydrating the 9(11) double bond of the resultant diether having the formula III

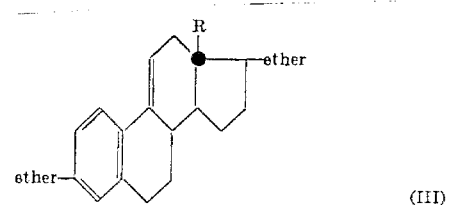

wherein R has the above-assigned values and "ether" represents an easily cleavable ether, by the action of a double bond hydrating agent selected from the group consisting of 1. boron trifluoride in the presence of an alkali metal borohydride or lithium aluminum hydride, followed by the action of hydrogen peroxide in an alkaline media, 2. diborane, followed by the action of hydrogen peroxide in an alkaline media, and 3. mercuric acetate in the presence of an alkali metal borohydride, C. reacting the resultant 11α-hydroxy steroid having the formula IV

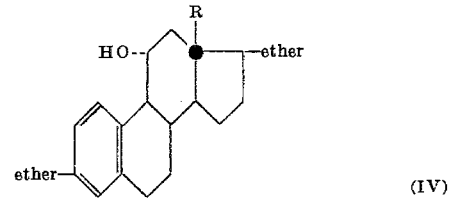

wherein R and "ether" have the above-assigned values, with a strong base followed by an alkylation agent, wherein the alkyl in said alkylation agent has from one to six carbon atoms, D. cleaving the resultant compound having the formula V

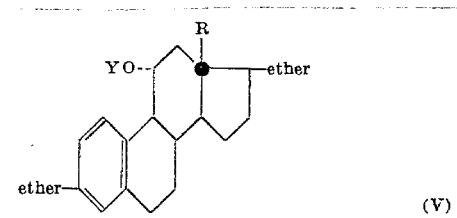

wherein R and "ether" have the above-assigned values and Y is alkyl having one to six carbon atoms, by the action of an acid in an aqueous media or by hydrogen in the presence of a catalyst, and obtaining 11α-OY-13β-R-gona-1,3,5(10)-triene-3,17β-diol having the formula VI

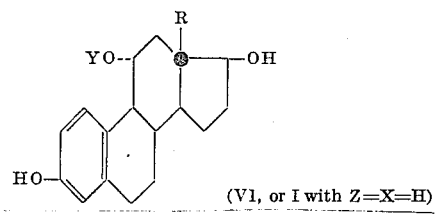

(VI, or I with Z=X=H)

The hydroxyl function in the 17β position can be esterified, if desired, and the hydroxyl function in the three position can be etherified, if desired, both by the usual methods.

In the given case, the hydroxyl function in the 17 position of compound VI may, if desired, be oxidized by the action of an oxidizing agent. The resulting 11α-OY-13β-R-gona-1,3,5(10)-triene-3-ol-17-one of the general formula VII

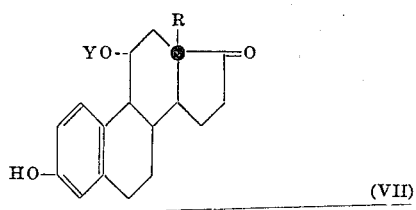

(VII)

is reacted with an organo metallic reactant having the organic radical X in order to obtain 11α-OY-13β-R-17α-X-gona-1,3,5(10)-triene-3,17β-diol of the general formula I with Z = H

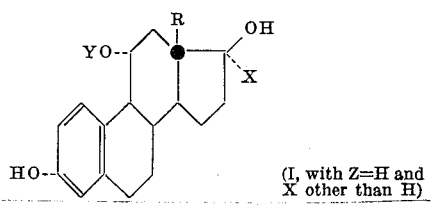

(I, with Z=H and X other than H)

which compound can be etherified eventually on the hydroxyl function in the three position by usual methods in order to obtain 3-OZ-11α-OY-13β-R-17α-X-gona-1,3,5(10)-triene-17β-ol of the general formula I with Z other than H

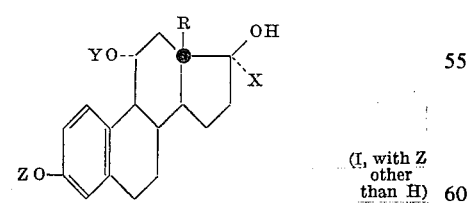

(I, with Z other than H)

This compound then can be esterified in the 17 position by the usual methods, if desired.

A. In the first step of etherification, the three and 17 hydroxyls are etherified to give an easily cleavable ether. By "easily cleavable" ether is meant an ether which can be cleaved by hydrolysis or hydrogenolysis. The etherification agent which is reacted with the 13β-R-gona-1,3,5(10), 9(11)-tetraene-3,17β-diol (II) in order to obtain the easily-cleavable diether is preferably selected from the group consisting of:

a. benzyl bromide after a preliminary action of a strong base,
b. 1,2-dihydropyran in the presence of a strong acid, such as p-toluenesulfonic acid,
c. triphenylmethyl halide in the presence of a tertiary base such as pyridine, and
d. trimethylsilyl halide in the presence of a tertiary base such as pyridine.

B. The hydration of the 9,11 double bond of the diether III is realized preferentially by the action of borane formed in situ by a reaction between boron trifluoride which is utilized in the form of its etherate in ethereal solution and lithium-aluminum hydride. The intermediate 11α-borane compound is then oxidized and cleaved by the action of hydrogen peroxide in alkaline media in order to give the 11α-hydroxylated derivative.

The hydration agent utilized can also be free, or formed in situ, diborane followed by the action of hydrogen peroxide in alkaline media or also mercuric acetate in the presence of alkali metal borohydride.

C. The strong base which is reacted with the 11α-hydroxylated derivative IV is preferably an alkali metal hydride, an alkali metal amide or an alkali metal alcoholate. The alkylation agent is preferably an alkyl halide and, in particular, an alkyl iodide.

D. The cleavage or hydrolysis of the ether functions in the three and 17 positions of the diether V is realized particularly by the action of an acid agent in the presence of water. In the case of the trityl ether, the acid agent utilized is preferably acetic acid, oxalic acid, or sulfuric acid. In the case of the benzyl ether, the acid agent utilized is preferably hydrochloric acid. In order to cleave the pyranyl ether, hydrochloric acid, acetic acid, p-toluenesulfonic acid or sulfuric acid are utilized. In the case of the trimethylsilyl ether, hydrochloric acid or sulfuric acid is preferably employed.

The trityl ether and the benzyl ether can also be cleaved by hydrogenolysis in the presence of a catalyst such as platinum or palladium.

E. The oxidation agent utilized in order to effect the oxidation of the hydroxyl function in the 17 position of the derivative VI is preferably chromic acid anhydride, manganese bioxide, bismuth oxide, cupric acetate, silver carbonate, silver silicate or lead tetraacetate. This oxidation can also be effected by the Oppenauer method utilizing a hydrogen acceptor, such as cyclohexanone or benzoquinone, in the presence of a catalyst, such as aluminum isopropylate. An N-chloro- or an N-bromoimide or amide can also be used.

F. The introduction of the hydrocarbonated substituent X in the 17α position of the 11α-OY-13β-R-gona-1,3,5(10)-trien-3-ol-17-one, VII, is effected by the action on compound VII of an organometallic reactant whose organic radical is X. With this object, particularly either the organomagnesium halides of the general formula, Hal MgX, Hal being an atom of halogen and particularly an atom of chlorine, bromine or iodine, or the alkali metal derivatives of the general formula XM, M being an alkali metal such as lithium, sodium or potassium or also an organo-zinc compound can be utilized.

G. In order to prepare the ethers in the three position of the 11α-OY-13β-R-17α-X-gona-1,3,5(10)-trien-3,17β-diol (I with Z = H), the latter compound is preferably reacted with an alkyl halide or aralkyl halide after forming a metallic derivative of the phenolic hydroxyl.

H. In order to prepare the esters in the 17 position of the 3-OZ-11α-OY-13β-R-17α-X-gona-1,3,5(10)-trien-17β-ol (I with Z other than H and X = H or alkyl), an organic carboxylic acid having one to 18 carbon atoms is preferably reacted with the 17 hydroxylated derivative in the presence of an acid catalyst, preferably while eliminating the water formed. Also a functional derivative of the acid such as the acid chloride or acid anhydride may be used in the presence of an acid acceptor.

The starting material estra-1,3,5(10),9(11)-tetraen-3,17β-diol can be obtained according to the process described in U.S. Pat. No. 2,885,413.

The starting material 13β-ethyl-gona-1,3,5(10),9(11)-tetraen-3,17β-diol is obtained according to the method described in U.S. Pat. No. 3,390,171. The other 13β-R-gona-1,3,5(10),9(11)-tetraen-3,17β-diols can be obtained by application of an analogous process. The intermediate compounds obtained in the course of the process, which is an object of the present invention, are new.

The following examples are illustrative of the invention without, however, being deemed limitative in any manner.

EXAMPLE 1

11α-Methoxy-estra-1,3,5(10)-triene-3,17β-diol

Step A: 3,17β-dibenzyloxy-estra-1,3,5(10),9(11)-tetraene 3.7 Grams of sodium hydride in a 50 percent suspension in vaseline oil, 80 cc of tetrahydrofuran and 7.94 gm of estra-1,3,5(10),9(11)-tetraene-3,17β-diol were mixed and heated to reflux for 30 minutes under nitrogen. 31.5 cc of benzyl bromide were added thereto and the reflux was maintained for a period of 5 hours. Next the mixture was poured into 250 cc of a mixture of N-sodium hydroxide solution and ice. The aqueous mixture was extracted with methylene chloride. The organic phases next were washed with water, dried over sodium sulfate and evaporated to dryness under vacuum. The residue was subjected to chromotography on silica gel with elution with a (1:1) mixture of cyclohexane and methylene chloride. After evaporation of the eluant, 10.9 gm of 3,17β-dibenzyloxy-estra-1,3,5(10),9(11)-tetraene were obtained in the form of a solid colorless product melting at 95°C and soluble in ethanol and methylene chloride and insoluble in water.

I.R. Spectra (chloroform)
Presence of C—O—C
Absence of OH
U.V. Spectra (ethanol)
Max. at 264 nm — $E_{1\ cm}^{1\%}$ 32 400
Infl. towards 270 nm — $E_{1\ cm}^{1\%} = 361$
Infl. towards 294–295 nm — $E_{1\ cm}^{1\%} = 86$
Infl. towards 307–308 nm — $E_{1\ cm}^{1\%} = 56$ Step B: 3,17β-dibenzyloxy-estra-1,3,5(10)-triene-11α-ol 4.5 Grams of 3,17β-dibenzyloxy-estra-1,3,5(10),9(11)-tetraene were dissolved in 250 cc of ether. 7.6 cc of borontrifluoride etherate were added. Then a suspension of 1.8 gm of lithium-aluminum hydride in 70 cc of ether were added. The mixture was agitated for 2 hours at room temperature. Next 70 cc of a saturated aqueous solution of sodium chloride was added under cooling and the mixture was agitated for 1 hour at room temperature. Thereafter the mixture was decanted. The ethereal phase was washed with a saturated aqueous solution of sodium chloride dried over sodium sulfate and evaporated to dryness under vacuum.

The residue was dissolved in 90 cc of tetrahydrofuran. 45 cc of a 3N-methanol solution of potassium hydroxide, then 36 cc of 110 volumes hydrogen peroxide were added and the mixture was agitated for 45 minutes at room temperature. The mixture was then distilled to a reduced volume and extracted with methylene chloride. The organic phases were washed with water, dried over sodium sulfate and evaporated to dryness under vacuum. The residue was subjected to chromotography through silica gel with elution with a mixture (1:9) of ethyl acetate and benzene. After evaporation of the eluant 2.7 grams of 3,17β-dibenzyloxy-estra-1,3,5(10)-triene-11α-ol were obtained in the form of a colorless amorphous product, soluble in benzene, chloroform and methanol, and insoluble in water.

I.R. Spectra (chloroform)
Presence of 11-hydroxy and $C_6H_5CH_2O$
Absence of conjugated phenol.
M.N.R. Spectra ($CDCl^3$)
Methylenes at 302 and 274 Hz
18 angular methyl at 51 Hz
$H_{17}$ at 205, 212 and 219 Hz
Absence of ethylenic $H_{11}$.

Step C: 3,17β-dibenzyloxy-11α-methoxy-estra-1,3,5(10)-triene 0.39 Grams of sodium hydride in a 50 percent suspension in vaseline oil and a solution of 2.53 gm of 3,1-7β-dibenzyl-oxy-estra-1,3,5(10)-triene-11α-ol in 35 cc of tetrahydrofuran were mixed and agitated for a period of 30 minutes at room temperature. Then 1.7 cc of methyl iodide were added and the mixture was agitated overnight at 20°C. The reaction mixture was poured into water and the aqueous mixture was extracted with methylene chloride. The organic phases were washed with water, dried over sodium sulfate and distilled to dryness under vacuum. The residue was dissolved in methylene chloride. 15 cc of ethanol were added and the methylene chloride was removed by distillation. The mixture was vacuum filtered and the precipitate washed with ethanol and dried. 2.28 Grams of 3,17β-di-benzyloxy-11α-methoxy-estra-1,3,5(10)-triene were obtained in the form of a colorless solid product melting at 149°C and soluble in methylene chloride and insoluble in water and ethanol.

Analysis: — $C_{33}H_{38}O_3$ molecular weight = 482.64
Calculated: — C percent 82.12 — H percent 7.94
Found: — 82.1 — 7.9
I.R. Spectra (chloroform)
Absence of OH
Presence of non-conjugated $C_6H_5$—O—R Step D: 11α-methoxy-estra-1,3,5(10)triene-3,17β-diol One gram of activated charcoal containing 10 percent of palladium and 10 cc of ethanol were mixed. A solution of one gm of 3,17β-dibenzyloxy-11α-methoxy-estra-1,3,5(10)-triene-in a mixture (1:1) of ethyl acetate and ethanol were added and a stream of hydrogen was passed through the reaction mixture while agitating the same until the end of the absorption of hydrogen. The catalyst was separated by vacuum filtration and the filter was washed with ethyl acetate. The combined mother liquors were evaporated to dryness under vacuum. The residue was dissolved in 15 cc of a mixture (6:4) of ethyl acetate and benzene and allowed to crystallize. The crystals were vacuum filtered, washed with a mixture (6:4) of ethyl acetate and benzene and dried at 80°C.

0.53 gm of 11α-methoxy-estra-1,3,5(10)-triene-3,17β-diol were obtained in the form of a solid colorless product melting at 146°C, then 215°C and soluble in ethanol, slightly soluble in chloroform and benzene and insoluble in water. The specific rotation was $[\alpha]_D^{20} = -67° \pm 2.5°$ ($c = 0.5$ percent in ethanol).

Analysis: — $C_{19}H_{26}O_3$ molecular weight = 302.40
Calculated: — C percent 75.46 — H percent 8.67
Found: — 75.0 — 8.6
I.R. Spectra (Nujol)
Presence of OH, aromatic ring substituted by a hetero atom and C—O—C.
U.V. Spectra (ethanol)
Infl. towards 217 nm — $E_{1\,cm}^{1\%} = 255$
Max. at 279-280 nm — $E_{1\,cm}^{1\%} = 61$ or $\epsilon = 1,850$

EXAMPLE 2

11α-Methoxy-17α-ethynyl-estra-1,3,5(10-triene-3,17β-diol
Step A: 11α-methoxy-estra-1,3,5(10)-triene- 3-ol -17-one One gram of 11α-methoxy-estra-1,3,5(10)-triene-3,17β-diol (obtained in Example 1) were dissolved in 30 cc of acetone. The solution was cooled to about +5°C and 1.25 cc of Heilbronn-Jones reactant of the composition:

Chromic acid anhydride . . . — 270 gm
Water . . . — 400 cc
Sulfuric acid . . . — 230 cc
Water, sufficient to make . . . — 1 liter were added and the mixture was agitated for 30 minutes at +5°C. Next a small amount of methanol was added and the mixture was extracted with methylene chloride. The organic phases were washed with an aqueous solution of sodium bicarbonate, then with water until the wash waters were neutral, dried over sodium sulfate and evaporated to dryness under vacuum. The residue was subjected to chromatography through silica gel with elution with a mixture (3:7) of ethyl acetate and benzene. The eluant was then evaporated.

The residue was dissolved in 6.6 cc of refluxing ethanol. The solution was iced for 15 minutes and the precipitate was vacuum filtered, washed with iced ethanol and dried. 0.37 Grams of 11α-methoxy-estra-1,3,5(10)-triene-3-ol-17-one was obtained in the form of a solid colorless product melting at 185°C, then at 210°C, and soluble in chloroform and benzene, slightly soluble in ethanol and insoluble in water.
I.R. Spectra (chloroform)
Presence of both free and associated OH, of aromatic ring substituted by hetero atom, and of 17-ketone.
U.V. Spectra (ethanol)
Infl. towards 218 nm — $E_{1\,cm}^{1\%} = 269$
Infl. towards 222 nm — $E_{1\,cm}^{1\%} = 253$
Max. at 275 nm — $E_{1\,cm}^{1\%} = 62$ or $\epsilon = 1,900$ Step B: 11α-methoxy-17α-ethynyl-estra-1,3,5(10)-triene-3,17β-diol 4.75 gm of potassium tert.-butylate were dissolved in 190 cc of tetrahydrofuran. The mixture was cooled to 0°C to +3°C and acetylene was bubbled therethrough at this temperature for 1 hour and 15 minutes. Thereafter a solution of 3.18 gm of 11α-methoxy-estra-1,3,5(10)-triene-3-ol-17-one in 95 cc of tetrahydrofuran was added. The mixture was agitated for 4 hours at 0°C to +3°C under an atmosphere of nitrogen while continuing the bubbling of acetylene therethrough. Then the reaction mixture was poured into a saturated aqueous solution of ammomium chloride and extracted with ethyl acetate. The organic phases were washed with water until the wash waters were neutral and dried over sodium sulfate. Some alumina was added. The mixture was vacuum filtered and evaporated to dryness under vacuum.

The residue was triturated in 30 cc of refluxing chloroform and then iced. The precipitate was vacuum filtered, washed with chloroform and dried. 2.31 gm of 11α-methoxy-17α-ethynyl-estra-1,3,5(10)-triene-3,17β-diol were recovered in the form of a solid colorless product melting at 282°C and soluble in tetrahydrofuran and slightly soluble in chloroform and ethanol. The specific rotation was $[\alpha]_D^{20} = -149° \pm 3°$ (c = 0.7 percent in ethanol).

Analysis: — $C_{21}H_{26}O_3$; — molecular weight = 326.42
Calculated: — C percent 77.27 — H percent 8.03
Found: — 77.0 — 8.05
I.R. Spectra (chloroform)
Presence of aromatic ring substituted by hetero atom, of OH, and of C ≡ CH
U.V. Spectra (ethanol)
Infl. towards 218 nm — $E_{1\,cm}^{1\%} = 235$
Infl. towards 222 nm — $E_{1\,cm}^{1\%} = 224$
Infl. towards 229 nm — $E_{1\,cm}^{1\%} = 154$
Max. at 279 nm — $E_{1\,cm}^{1\%} = 56$ or $\epsilon = 1,830$
Infl. towards 284 nm — $E_{1\,cm}^{1\%} = 51$

EXAMPLE 3

Pharmacological Study

1. Tests of anti-estrogenic activity:

The anti-estrogenic activity of the product of the present invention was determined on pre-puberty mice by a technique inspired by the Rubin test (Endo. 1951, 49, 429) and similar to that of Dorfman et al. (Methods in Hormone Research, Dorfman, 1962, Vol. II, 118).

The estrogen utilized was estradiol. Female mice aged from 19 to 21 days were divided into groups of four. They received by subcutaneous injection daily for 3 days either the estradiol alone or the product studied alone, or the estradiol and the product studied. In the last case, the two steroids were injected at different points. The mice were sacrificed the fourth day and their uteri were separated and weighed.

The estradiol, in solution in olive oil containing 5 percent of benzyl alcohol, was administered at a total dose of 0.27 γ. Each injection was made with a volume of 0.1 cc per mouse.

The 11α-methoxy-estra-1,3,5(10)-triene-3,17β-diol utilized in solution in olive oil containing 5 percent of benzyl alcohol was administered at doses of 10, 90, and 810 γ in a first test, and 30, 90 and 270 γ in a second test. The injections were always made in a volume of 0.1 cc per mouse. The results obtained are indicated in the following Table I.

TABLE I

| Lots | Doses γ | Average of the Weights of the Uteri in mg |
|---|---|---|
| Controls | 0 | 6.98 |
| Estradiol | 0.27 | 70.55 |
| Product studied | 10 | 20.93 |
| Product studied + estradiol | 10 + 0.27 | 55.85 (−21%) |
| Product studied | 90 | 20.75 |
| Product studied + estradiol | 90 + 0.27 | 46.43 (−34%) |
| Product studied | 810 | 34.10 |
| Product studied + estradiol | 810 + 0.27 | 43.05 (−39%) |
| Controls | 0 | 6.73 |
| Estradiol | 0.27 | 72.18 |
| Product studied | 30 | 13.35 |
| Product studied + estradiol | 30 + 0.27 | 51.70 (−28%) |
| Product studied | 90 | 19.78 |
| Product studied + estradiol | 90 + 0.27 | 55.98 (−24%) |
| Product studied | 270 | 23.70 |
| Product studied + estradiol | 270 + 0.27 | 47.10 (−35%) |

11α-methoxy-17α-ethynyl-estra-1,3,5(10)-triene-3,17β-diol, utilized in solution in sesame seed oil and administered under the same operating conditions, at doses of 3, 10, and 30 γ furnished the results given in the following Table II.

TABLE II

| Lots | Doses γ | Average of the Weights of the Uteri in mg |
|---|---|---|
| Controls | 0 | 13.3 |
| Estradiol | 0.27 | 64.7 |
| Product studied + estradiol | 3 + 0.27 | 51.2 (−21%) |
| Product studied | 10 | 24.2 |
| Product studied + estradiol | 10 + 0.27 | 46.5 (−29%) |
| Product studied | 30 | 32.1 |
| Product studied + estradiol | 30 + 0.27 | 42.6 (−34%) |

These results show that the two products possess an important anti-estrogenic activity with reference to the dose of 0.27 γ of estradiol. They do not manifest at any dose a significant uterotropic action.

2. Determination of the anti-gonadotrophic acitivity:

The anti-gonadotrophic activity was determined in mature rats weighing about 200 gm. 11α-methoxy-estra-1,3,5(10)-triene-3,17β-diol utilized in solution in olive oil containing 5 percent of benzyl alcohol was administered subcutaneously in a volume of 0.2 cc on a basis of 12 treatments in 14 days at daily doses of 50 γ, 200 γ and 1 mg per animal. On the fifteenth day the rats were sacrificed by carotidal bleeding and the seminal vesicules, prostate, testicles and suprarenals were separated and weighed. The results are given in Table III.

TABLE III

| Lots | Daily Dose | Testicles gm | Seminal Vesicules mg | Prostate mg | Suprarenals mg |
|---|---|---|---|---|---|
| Controls | 0 | 2.4 | 360.0 | 232.5 | 36.9 |
| Product studied | 50γ | 2.5 | 380.3 | 246.5 | 44.2 |
|  | 200γ | 2.5 | 335.4 | 219.8 | 42.4 |
|  | 1 mg | 2.3 | 98.3 (−73%) | 98.8 (−58%) | 46.1 |

It can be noted from these results that 11α-methoxy-estra-1,3,5(10)-triene-3,17β-diol possesses an important anti-gonadotrophic activity at a daily dose of 1 mg.

3. Exogenic anti-androgenic activity:

The exogenic anti-androgenic activity of 11α-methoxy-estra-1,3,5(10)-triene-3,17β-diol was determined with reference to testosterone propionate in the castrated male rat according to the method of Lerner described by Dorfman in "Methods in Hormone Research," Vol. II, page 320.

Young male rats of about 4 weeks of age were castrated. The treatment commenced the day following the castration and lasted 7 days. The eighth day the animals were sacrificed and the following organs were separated: Prostate, seminal vesicles and levator ani. 11-α-methoxy-estra-1,3,5(10)-triene-3,17β-diol was administered at the dose of 1 400 γ per day per rat subcutaneously, in solution in sesame seed oil containing 5 percent of benzyl alcohol. Testosterone propionate was administered at a dose of 50γ per rat per day subcutaneously. The following groups of rats were utilized:

a. a control group which received the solvent;

b. a group of rats to which 50γ of testosterone propionate was administered subcutaneously;

c. a group of rats to which 1 400γ of the product studied was administered subcutaneously;

d. a group of rats which received 1 400γ of the product studied, subcutaneously, and 50 γ of testosterone propionate, subcutaneously.

Table IV below gives the results obtained.

TABLE IV

| Lots | Daily Dose | Fresh Levator Ani mg | Seminal Vesicules mg | Prostates mg |
|---|---|---|---|---|
| Controls | 0 | 23.2 | 12.8 | 10.7 |
| Testosterone propionate | 50γ | 51.1 | 66.7 | 99.9 |
| Product studied | 400γ | 24.3 | 11.6 | 10.7 |
| Product studied + testosterone propionate | 400γ +50γ | 44.1 | 63.1 | 83.7 |

11α-methoxy-estra-1,3,5(10)-triene-3,17β-diol showed a certain exogenic, anti-androgenic activity.

The preceding specific embodiments illustrate the practice of the invention. It is to be understood, however, that other expedients known to those skilled in the art or disclosed herein may be employed without departing from the spirit of the invention or the scope of the appended claims.

We claim:
1. 11α-alkoxylated steroids having the formula

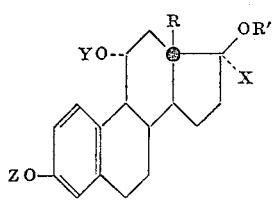

wherein R is alkyl having one to three carbon atoms, X represents a member selected from the group consisting of hydrogen, aliphatic hydrocarbon having one to six carbon atoms, halogenated aliphatic hydrocarbon having one to six carbon atoms, and cycloalkyl having three to six carbon atoms, Y is alkyl having one to six carbon atoms, Z represents a member selected from the group consisting of hydrogen, alkyl having one to six carbon atoms and phenyl alkyl having seven to nine carbon atoms, and R' represents a member selected from the group consisting of hydrogen and the acyl of an organic carboxylic acid having from one to 18 carbon atoms.

2. The compound of claim 1 wherein R and Y are methyl and R', X and Z are hydrogen.

3. The compound of claim 1 wherein R and Y are methyl, X is ethynyl, and R' and Z are hydrogen.

4. A process for the preparation of the 11α-alkoxylated steroids of claim 1 which consists essentially of reacting a 13β-R-gonatetraenediol having the formula

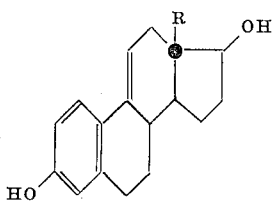

wherein R is alkyl having one to three carbon atoms, with an etherifying agent to form an easily cleavable ether cleavable by hydrolysis or hydrogenolysis, hydrating the 9(11) double bond of the resultant diether having the formula

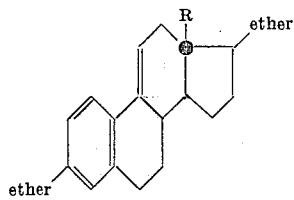

wherein R has the above-assigned values, and "ether" represents an easily cleavable ether, by the action of a double bond hydrating agent selected from the group consisting of (1) boron trifluoride in the presence of an alkali metal borohydride or lithium aluminum hydride, followed by the action of hydrogen peroxide in an alkaline media, (2) diborane, followed by the action of hydrogen peroxide in an alkaline media, and (3) mercuric acetate in the presence of an alkali metal borohydride, reacting the resultant 11α-hydroxy steroid having the formula

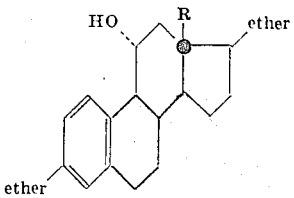

wherein R and "ether" have the above-assigned values, with a strong base selected from the group consisting of alkali metal hydrides, alkali metal amides and alkali metal alcoholates followed by an alkyl halide having from one to six carbon atoms, cleaving the resultant compound having the formula ![structure]

wherein R and "ether" have the above-assigned values and Y is alkyl having one to six carbon atoms, by the action of an acid in an aqueous media or by hydrogen in the presence of a catalyst selected from the group consisting of platinum and palladium and recovering said 11α-alkoxylated steroids.

5. The process of claim 4 wherein said 11α-alkoxylated steroid where R' and X are hydrogen is oxidized by an oxidizing agent which oxidizes a 17β-hydroxyl group selected from the group consisting of chromic acid anhydride, manganese bioxide, bismuth oxide, cupric acetate, silver carbonate, silver silicate, lead tetraacetate, cylcohexanone in the presence of aluminum isopropylate, benzoquinone in the presence of aluminum isopropylate, N-chloroimides, N-chloroamides, N-bromoimides and N-bromoamides, the resulting 17-one steroid having the formula ![structure]

wherein R and Y have the values assigned in claim 4, is reacted with an organometallic reactant whose organic radical is X', X' representing a member selected from the group consisting of aliphatic hydrocarbon having one to six carbon atoms, halogenated aliphatic hydrocarbon having one to six carbon atoms and cycloalkyl having three to six carbon atoms, and recovering said 11α-alkoxylated where X = X'.

6. 3,17-diether steroids having the formula

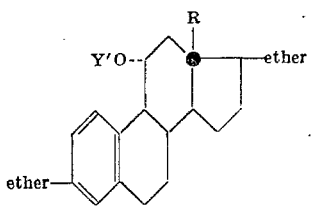

wherein R is alkyl having one to three carbon atoms, Y' is selected from the group consisting of hydrogen and alkyl having one to six carbon atoms and "ether" represents an ether linkage which is easily cleavable.

7. The product of claim 6 wherein R is methyl, Y' is hydrogen and "ether" is benzyloxy.

8. The product of claim 6 wherein R and Y are methyl and "ether" is benzyloxy.

9. 3,17-diether Δ 9(11)-steroids having the formula

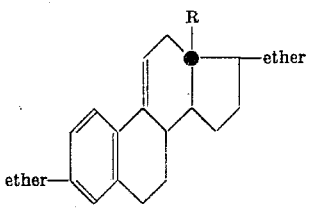

wherein R is alkyl having one to three carbon atoms, and "ether" represents an ether linkage which is easily cleavable.

10. The product of claim 9 wherein R is methyl and "ether" is benzyloxy.

11. 11α-alkoxylated 17-one steroids having the formula

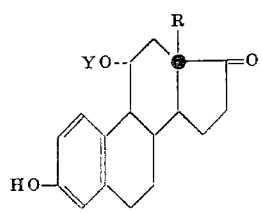

wherein R is alkyl having one to three carbon atoms, Y is alkyl having one to six carbon atoms.

12. The product of claim 11 wherein R and Y are methyl.

* * * * *